United States Patent
Fu

(10) Patent No.: US 8,786,549 B2
(45) Date of Patent: Jul. 22, 2014

(54) GYRO MOUSE DE-DRIFT AND HAND JITTER REDUCTION

(75) Inventor: Guoyi Fu, Vaughan (CA)

(73) Assignee: Seiko Epson Corporation, Tokyo (JP)

( * ) Notice: Subject to any disclaimer, the term of this patent is extended or adjusted under 35 U.S.C. 154(b) by 648 days.

(21) Appl. No.: 13/046,217

(22) Filed: Mar. 11, 2011

(65) Prior Publication Data

US 2012/0229385 A1   Sep. 13, 2012

(51) Int. Cl.
*G09G 5/08* (2006.01)
*G06F 3/033* (2013.01)
*G03B 17/00* (2006.01)

(52) U.S. Cl.
USPC .......................................... 345/161; 396/55

(58) Field of Classification Search
None
See application file for complete search history.

(56) References Cited

U.S. PATENT DOCUMENTS

| | | | |
|---|---|---|---|
| 5,825,350 A | 10/1998 | Case, Jr. et al. | |
| 5,898,421 A | 4/1999 | Quinn | |
| 2004/0052513 A1* | 3/2004 | Ohkawara et al. | 396/55 |
| 2006/0184966 A1 | 8/2006 | Hunleth et al. | |
| 2009/0033807 A1 | 2/2009 | Sheng et al. | |
| 2010/0123659 A1 | 5/2010 | Beeman et al. | |
| 2010/0290769 A1* | 11/2010 | Nasiri et al. | 396/55 |

* cited by examiner

*Primary Examiner* — Amr Awad
*Assistant Examiner* — Andre Matthews

(57) ABSTRACT

A gyroscope-based device uses a probability model to assign probability of the device being in an intended static state to each received sample of gyroscope data. A new drift error compensation offset and new hand jitter factor are computed for each sample of gyroscope data based on the assigned probability. In this manner, the magnitude of the hand jitter factor varies with the probability of the device being in an intended static state.

18 Claims, 8 Drawing Sheets

GYRO MOUSE DE-DRIFT AND HAND JITTER REDUCTION

BACKGROUND

1. Field of Invention

The present invention relates to gyroscopes integrated into handheld devices. More specifically, it relates to methods/systems for mitigating gyroscope drift error and hand jitter error in such devices.

2. Description of Related Art

A computer mouse is a type of computer input device. A common form of these input devices is the planar-surface-based computer mouse, which is moved on a planar surface to control a computer cursor on a screen, with movements of the cursor corresponding to movements of the mouse. Objectives in the design of a computer mouse are versatility, accuracy, ease of use, and intuitiveness of corresponding movements between the mouse and the cursor on the screen.

Computer mouse technology has undergone various permutations over the years. An early computer mouse technology used a light beam emanated from under the mouse onto a planar, reflective surface covered with a grid line pattern. Mouse movement was tracked by noting the grid lines that the emanated light beam crossed as the mouse was moved. This technology offered relatively high accuracy, as determined by the pitch of the grid lines, but was hindered by high cost and the need for specialized reflective grid surfaces.

Another computer mouse technology used a mechanical roller ball, or track ball, to track mouse movements. This reduced the cost of the mouse and removed the need for a reflective grid surface, but offered lower accuracy and reliability. To improve the accuracy of this type of mouse, a high friction surface, i.e. a mouse pad, was typically required.

The introduction of inexpensive silicon lasers and LEDs greatly improved the accuracy of a computer mouse while at the same time eliminating the need for a mechanical ball and high friction surface. However, mouse movement was still restricted to a planar surface.

Human arm and hand movements, or gestures, are free flowing and not restricted to a two-dimensional plane. More specifically, such hand gestures are not restricted to a flat surface, although a computer screen (at which the hand gestures may be directed) is typically a flat surface. Thus, a need exist for better translation of free-flowing hand gestures within a three-dimensional space to movements of a computer cursor on a two-dimensional computer screen.

The introduction of miniature gyroscope technology brought about the advent of the gyroscope-based mouse, which is not limited to movements on a planar surface. Rather, a group of gyroscopes (i.e. three gyroscopes) within the mouse permit it to detect mouse motion within a three-dimensional space.

Several challenges stand in the way of the gyroscope-based mouse becoming a prevalent computer mouse technology. First is a limitation of the gyroscope technology itself. To make a commercially viable mouse, requires the use of relatively inexpensive gyroscopes, which unfortunately are prone to drift error. That is, they will indicate a motional drift even when there is no motion. This motional drift is typically small, but cumulative, and its cumulative effect can cause a computer cursor to drift in an unintended manner. A gyroscope-based mouse should compensate for this drift error phenomenon.

Another limitation of the gyroscope-based mouse is the human operator of the mouse. A human typically cannot maintain a perfectly steady hand for prolong periods; rather, the hand is prone to involuntary shaking (i.e. hand jitter). When a gyroscope-based mouse is held in the hand in a free-flowing manner, hand jitter will translate into unwanted shaking of the mouse, which will then result in unintended shaking of a corresponding cursor on a computer screen. A gyroscope-based mouse should likewise compensate for this hand jitter phenomenon.

One method of addressing drift error and hand jitter error is to filter out small and/or slow movements, but this tends to reduce the mouse's fine cursor control since it no longer responds accurately to intentional small/slow movements.

The company Gyration™ produces an example of a gyroscope-based mouse that is a combination of a traditional flat surface-based mouse and a Gyro mouse. A description of their gyroscope-based mouse, and of how they address some of the issues that afflict a Gyro mouse are described in U.S. Pat. No. 5,825,350 and U.S. Pat. No. 5,898,421, herein incorporated in their entirety by reference. One approach to addressing drift error and hand jitter, as proposed by Gyration, is to provide an activation button to enable/disable the Gyro mouse, or to lock the computer cursor in place on a display screen. Although this effectively masks the effects of drift error and hand jitter on the computer cursor while the Gyro mouse is disabled, these errors return when the mouse is once again enabled. Furthermore, since drift error and hand jitter are not addressed directly, fine cursor control remains illusive.

What is needed is a gyroscope-based mouse that offers fine cursor control and high accuracy. Preferably, such a gyroscope-based mouse should utilized inexpensive gyroscopes, but offer effective compensation for drift error and hand jitter. Furthermore, its error compensation should not impede the mouse's ability to quickly respond to intended small and/or slow mouse movements.

SUMMARY OF INVENTION

It is an object of the present invention to provide a gyroscope-based mouse that utilizes inexpensive gyroscopes, but that compensates for gyroscope drift while maintaining a high level of accuracy, even with intentionally small movements.

It is another object of the present invention to provide a gyroscope-based mouse that compensates for natural shaking in a human hand, while still responding quickly to intended mouse movement.

These objects are met in a gyroscope-based device having: an input for receiving angle velocity data obtained from digitized gyroscope sensor data; a first summation node for reducing said angle velocity data by a drift error compensation offset; a first multiplication node for multiplying the result of said first summation node by a variable hand jitter compensation factor to produce a new angle velocity; and an output node for outputting said new angle velocity; wherein the value of said variable hand jitter compensation factor is dependent upon a computation of involuntary movement currently experienced by said gyroscope-based device as determined from a currently received angle velocity datum.

In one embodiment of the present invention, the computation of involuntary movement is a determination of the amount of hand jitter being currently experienced by the gyroscope-based device, and the value of the variable hand jitter compensation factor is directly proportional to the determined amount of hand jitter being currently experienced by the gyroscope-based device.

In this approach, it is preferred to define a predefined number of fixed hand jitter compensation values and the same predefined number of hand jitter value ranges in a one-to-one correspondence. The gyroscope-based device then identifies the hand jitter value range within which the determined amount of hand jitter being currently experienced resides, and assigns the fixed hand jitter compensation value corresponding to the identified hand jitter value range to the variable hand jitter compensation factor.

Further in this embodiment, it is preferred that the predefined number of fixed hand jitter compensation values is set to three corresponding to three hand jitter value ranges, the three hand jitter value ranges defining a "small hand jitter user style" range for the lowest hand jitter range, a "normal hand jitter user style" range for the intermediate hand jitter range, and a "big hand jitter user style" range for the highest hand jitter range, and the hand jitter style range of the gyroscope-based device is continuously monitored, and a determination of whether the gyroscope-based device is being operated in the "small hand jitter user style", the "normal hand jitter user style", or "big hand jitter user style" is continuously updated; and the fixed hand jitter compensation value corresponding to the "big hand jitter user style" is greater than the fixed hand jitter compensation value corresponding to the "normal hand jitter user style", which in turn is greater than the fixed hand jitter compensation value corresponding to the "small hand jitter user style".

Preferably, the determined amount of hand jitter being currently experienced is determined by comparing the gyroscope-based device's current movements along a given axis with similar movements in its immediate past along the same axis.

In another embodiment of the present invention, the computation of involuntary movement is a computation of probability of the gyroscope-based device being in a static state.

In this other embodiment, each current sample n of the digitized gyroscope sensor data defines a current cycle; the currently received angle velocity datum is identified as G_Corr(n) and is obtained from current sample n of the digitized gyroscope sensor data; the new angle velocity obtained from the current sample n of the digitized gyroscope sensor data is denoted as G_New(n); and the gyroscope-based device further having: a) a probability processing unit receiving the intermediate angle velocity and determining a probability p(n) value for the current sample n, the probability p(n) being the computation of probability of the gyroscope-based device being in a static state within the current cycle defined by current sample n; and wherein the value of the variable hand jitter compensation factor for the current sample n is denoted as k(n) and is defined as k(n)=1−p(n).

Preferably, the probability processing unit implements a static-condition model defined as:

$$p(n) = \left(e^{-\frac{v(n)}{2\sigma_v^2}}\right)\left(e^{-\frac{m(n)}{2\sigma_m^2}}\right)\left(e^{-\frac{\omega'(n)}{2\sigma_{\omega'}^2}}\right)$$

where v(n) is the variance of angle velocity data G_Corr over an immediate history period, m(n) is the mean of the angle velocity data over the same fixed immediate history period, ω'(n) is an intermediate angle velocity defined as $$\omega'(n)=G\_Corr(n)-b'$$

where b' is an estimated drift error compensation offset not derived from a current drift error compensation offset computed for the current sample n, and $\sigma_v$, $\sigma_m$ and $\sigma_{\omega'}$ are predefined probability parameters.

In this approach, the immediate history period is fixed and set to the immediate 500 samples of the digitized gyroscope sensor data.

Also in this approach, the probability parameters $\sigma_v$, $\sigma_m$ and $\sigma_{\omega'}$ have values of 1 dps, 0.3 dps, and 3 dps, respectively. Additionally, variance v(n) and mean m(n) are determined for a period T defined by 30 samples of the digitized gyroscope sensor data. The variance v(n) is defined as:

$$v(n) = \sum_{i=n-T}^{n-1} \frac{(G\_New(i) - m(n))^2}{T}$$

and mean m(n) is defined as:

$$m(n) = \sum_{i=n-T}^{n-1} \frac{G\_New(i)}{T}$$

where i<n.

Preferably, samples n of the digitized gyroscope sensor data are provided at a rate of 100 Hz, and period T 300 milliseconds.

Further preferably, this embodiment has a first memory for storing a history of past G_New(n) values determined from previous samples of the digitized gyroscope sensor data, the first memory being coupled to the probability processing unit.

Additionally in this embodiment, the current compensation offset for the current sample n of the digitized gyroscope sensor data is denoted as b(n), and is defined as:

$$b(n)=(k(n)\times\omega'(n)\times p(n))+(b\_p(n)\times(1-p(n)))$$

where b_p(n) is a prediction value based on a moving average over a fixed period defined by a fixed number of a number of samplings M in an immediate history of past b(n) values, b_p(n) being defined as:

$$b\_p(n) = \sum_{i=n-M}^{n-1} \frac{b(i)}{M}$$

where b(i) are the compensation offset values from the indicated previous cycles, and i<n. Preferably, the estimated compensation b' is defined as b'=b(n−1).

This embodiment may also have a second memory for storing a history of past b(n) values determined from previous samples of the digitized gyroscope sensor data, the second memory being coupled to the first summation node.

In one implementation of this embodiment, the first summation node receives b' and G_Corr(n). In an alternate implementation of this embodiment, the first summation node received b(n) and G_Corr(n).

Also in this embodiment, a current compensation offset b is preferably determined for each current sample n of the digitized gyroscope sensor data, and estimated compensation offset b' is set to the compensation offset b determined in the immediately previous cycle.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
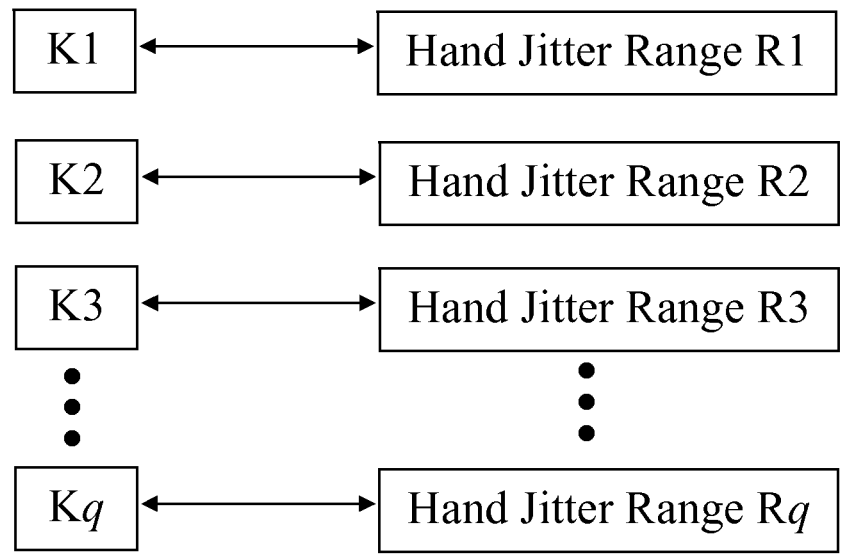
FIG. 1 is an example of a first approach toward addressing hand jitter.

It has been found that in a three-dimensional (3D) environment (i.e. an environment with an x-axis, y-axis, and z-axis), translation of 3D movement to a computer cursor on a two-dimensional (2D) surface (i.e. a flat computer screen, or image) is achievable by monitoring mouse movement in only two of the three axes.

That is, good translation of mouse movements to intended cursor movements is achievable by a dual-axis gyroscope, i.e. a gyroscope limited to monitoring to two axes. It has further been found that a dual-axis gyroscope that includes an x-axis gyroscope for monitoring x-axis motion and a z-axis gyroscope for monitoring z-axis motion is sufficient for accurately controlling a computer cursor on a two-dimensional screen.

Therefore, a preferred application of the present invention is a dual-axis gyroscope-based mouse, or Gyro mouse. However, since the present invention is disclosed as applied individually to each gyroscope of a multi-gyroscope system (i.e. a Gyro mouse in a preferred embodiment), it is to be understood that the present embodiments are readily expandable from a dual-axis system to a system having one, three or more gyroscopes. Therefore, part of the present discussion addresses the x-axis, y-axis, and z-axis gyroscopes of a 3D Gyro mouse, with the understanding that if a dual-axis Gyro mouse is desired, then only an x-axis gyroscope and a z-axis gyroscope would generally be need.

With a dual-axis gyroscope, the Gyro mouse detects the motion of one's hand and relays this information to a computer, eventually leading to movement of a mouse-pointer (i.e. computer cursor, or cursor) on a computer screen, such as a computer monitor. For example, the raising of one's hand may cause the mouse-pointer to move towards the top of the screen, and the lowering of one's hand may cause the mouse-pointer to move towards the bottom of the screen. Similarly, tilting upward the Gyro-mouse may cause the mouse-pointer to move towards the top of the screen, and tilting downward the Gyro-mouse may cause the mouse-pointer to move towards the bottom of the screen.

The Gyro mouse gives a user the ability to move a mouse with natural hand movements, free from a desktop or other flat surface. Additionally, if the Gyro mouse is used as a remote control device, it can provide greater freedom in internet surfing, video gaming, multi-media control and mobile computing.

Typically, each gyroscope continuously outputs a voltage. A change in this output voltage (or bias) is indicative of a change in position (i.e. physical displacement) of the gyroscope, and an algorithm processes the change in the output voltage to determine an appropriate cursor movement response.

Since a gyroscope's output voltage is continuous, however, a gyroscope produces an output voltage even when it is at rest. This at-rest voltage may be termed a static-offset. A problem that afflicts gyroscope sensors is that this static-offset is not static, even while the gyroscope is static. Rather, the static-offset is prone to change in response to a multitude of environmental and physical factors. For example, the static-offset may change in response to temperature variations or small changes in the gyroscope's structure. As the static-offset changes, the algorithm processing the gyroscope's output voltage may interpret this changing voltage as indicative of a physical displacement and move the cursor accordingly. This unintended cursor movement is termed drift error.

Due to the nature of gyroscope sensors, drift error tends to be cumulative over time. Therefore, even a small drift error for longer than a few minutes will result in a sizable and unintentional angle displacement due to error integration (i.e. the cumulative effect of the error). This problem is particularly acute in low-cost gyroscopes, where even a few seconds are sufficient to accumulate a significant drift error.

One method of compensating for drift error is to place dampeners that reduce the magnitude of the drift error. This, however, reduces the mouse's accuracy since it can no longer respond properly to fine motion, i.e. intentional small movements.

Another problem that afflicts a Gyro mouse arises when the Gyro mouse is used as an air mouse (i.e. controlled without the aid of a supporting flat surface). When used as an air mouse, the Gyro mouse must cope with hand jitter (i.e. involuntary hand motion when no mouse movement is intended). Because of hand jitter, static air mouse conditions (i.e. maintaining the air mouse in a non-moving, steady condition) are difficult to achieve in normal use.

In an average user, hand jitter may be up to five degrees-per-second (5 dps). This hand jitter error is exacerbated by the Gyro mouse's scaling factor, which amplifies the hand jitter and results in the computer cursor vibrating involuntarily on the display screen. In order to stabilize the computer cursor, which is responsive to motion signals from the Gyro mouse, a hand jitter reduction technique is needed to compensate for (i.e. reduce or remove) hand jitter error.

One method of compensating for hand jitter error is to add motion filters to filter out small (and optionally short and quick) movements of the Gyro mouse. An example of this approach is to impose a cut-off on the Gyro mouse (i.e., a minimum threshold on the amount of movement detected by the gyroscope-based mouse before the mouse indicates that a corresponding movement of a computer cursor is required).

Generally, hand jitter reduction techniques do not impede a Gyro mouse's response to large movements, which tend to be accurate and fairly smooth, but they do impede the Gyro mouse's response to purposeful small and/or slow movements of the Gyro mouse by the human operator since such movements are filtered out. The Gyro mouse's accuracy and sensitivity to intentional small mouse movements is hindered by the filtering out (or loss) of small and/or slow motion, which prevents the Gyro mouse from responding well to intentional movements within a small range or at a slow speed. This makes accurate, fine control of the computer cursor more difficult to achieve.

Thus, the challenges to achieving fine cursor control (i.e. accurate cursor response to intentional small or slow movement of the mouse) in a Gyro mouse are closely related to the challenges to overcoming drift error and hand jitter error. An objective is to find a balance between fine cursor control and reduction in drift error and hand jitter error.

The following are novel approaches toward improving Gyro mouse control in term of de-drift (i.e. correcting for drift error) and hand jitter error reduction while achieving fine motion control and an accurate cursor response. The following also proposes an algorithm to compute a continuously updated compensation offset b and a continuously updated compensation (scaling) factor k to minimizing unintentional cursor movement in a continuously updated manner. The compensation offset b is computed to reduce drift error, and the compensation factor k is computer to reduce hand jitter.

Although the compensation offset b targets drift error and the compensation factor k targets hand jitter error, both basically address the same general problem of mitigating unwanted and unintended cursor movement. It is to be understood that their joint operation provides better results than either one functioning alone. Nonetheless for ease of explanation, the compensation factor k is described first. A description of a preferred method of continuously updating the compensation offset b is described afterwards.

In a preferred embodiment of the present invention, a balance between fine cursor control and hand jitter error reduction is maintained by means of a variable (i.e. continuously updated) compensation factor k that counters motion signals due to hand jitter. That is, compensation factor k reduces the magnitude of detected motion signals by the scaling value of compensation factor k. If the human operator of a gyroscope-based device (i.e. a Gyro mouse) is experiencing small hand jitter, then compensation factor k is small. As the magnitude of hand jitter increases, the scaling value of compensation factor k likewise increases.

A human operator tends to exert greater mouse control (i.e. a more steady hand) when the operator desires greater control over cursor movements, and thus the operator tends to exhibit less hand jitter during these times. A reduced compensation factor k effectively makes unnoticeable any small hand jitter without unduly interfering with the operator's desired fine cursor control. However, when the Gyro mouse operator does not desire fine cursor control, the operator may focus less on maintaining the Gyro mouse steady, and the Gyro mouse may tend to experience a higher level of hand jitter. During these times, compensation factor k is increased accordingly.

With reference to FIG. 1, in one embodiment of the present invention defines a fixed number of predefined scaling values K1 to Kq for compensation factor k having a one-to-one correspondence with an equal number of predefined hand jitter calculation (or computation) ranges R1 to Rq. Calculation ranges R1 to Rq are thus computation ranges of involuntary movement. The scaling values of compensation factor k corresponding to each hand jitter calculation range is preferably empirically determined to provide a good balance between hand jitter reduction and fine cursor control. The Gyro mouse then selects from among the available plurality of predefined scaling values K1 to Kq for compensation factor k according to a calculation of the amount of hand jitter currently being experienced by a human operator and within what hand jitter range R1 to Rq the calculation resides.

In another embodiment of the present invention, the number of predefined scaling values for compensation factor k is set to three compensation factor k values corresponding to three hand jitter calculation ranges. Preferably, the three hand jitter calculation ranges are termed a "small hand jitter user" style for the lowest hand jitter range, a "normal hand jitter user" style for the intermediate hand jitter range, and a "big hand jitter user" style for the highest hand jitter range.

The hand jitter style of the operator of the Gyro mouse is continuously monitored, and a determination of whether the Gyro mouse is being operated in the style of a "small hand jitter user", a "normal hand jitter user", or "big hand jitter user" is continuously updated. The compensation factor k value for a "big hand jitter user" is greater than the compensation factor k value for a "normal hand jitter user", which in turn is greater than the compensation factor k value for a "small hand jitter user".

Determination or categorization of a user's hand jitter style may be made based on the user's currently assessed amount of hand jitter. If it is determined that the operating style of the user changes from one style to another, then selection of the predefined compensation factor k value is changed accordingly. This determination may be made by comparing the Gyro mouse' current movements (shaking or oscillating motion) along any given axis with similar movements in its immediate past along the same axis.

This approach provides some relief from the aforementioned hand jitter error, but its effectiveness is limited to the number of predefined compensation factor k values, and to its ability to quickly and a correctly identify changes in an operator's hand jitter style. An alternate preferred embodiment of the present invention for compensating for hand jitter does not limit the compensation factor k to a fixed number of scaling values. Rather, an appropriate, variable, compensation factor k is continuously computed and updated according to a continuous computation (i.e. a computed probability) of involuntary movement, such as due to the operator's hand jitter, or of intended controlled motion.

In this alternate preferred embodiment, unintentional movement of the Gyro mouse (such as from hand jitter) is continuously monitored and an appropriate scaling value for compensation factor k is computed. If it is determined that an intentional small or slow movement of the mouse is being made by the Gyro mouse operator, then the current hand jitter compensation factor k may be frozen (or eliminated, i.e. made equal to unity (one)) and not updated until it is determined that the intentional small mouse movement has ended. This monitoring and determination may be made by comparing the Gyro mouse's current movements along any given axis to movements in its immediate past along the same axis.

Before discussing a preferred method of computing a measure of the operator's hand jitter and computing updates for compensation factor k, it is beneficial to first describe the operation of gyroscope sensors prior to introducing drift error compensation and hand jitter error compensation. Understanding how gyroscope sensors are incorporated into a gyroscope-based device, and how the sensors' output signals are processed to determine motion, will aid in the understanding of the presently preferred methods of compensating for drift error and/or hand jitter error.

Figure 2:
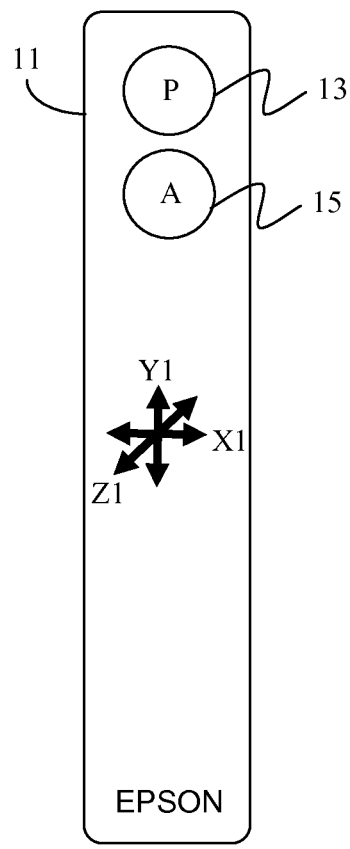
FIG. 2 is an example of a gyroscope-based mouse.

With reference to FIG. 2, in a gyroscope-base device, such as Gyro mouse 11, the device's motion is detected by a plurality of gyroscopes sensors (Gyro sensors) X1, Y1, and Z1, resulting in motion detection data (i.e. Gyro data). In the present illustration, Gyro sensors X1, Y1, and Z1 are represented by double-sided arrows defining dimension/axes markers. It is to be understood that Gyro sensors X1, Y1 and Z1 would be internal to Gyro mouse 11, and that Gyro mouse 11 would preferably incorporate de-drift and hand jitter compensation techniques. Gyro mouse 11 is also shown with two control buttons 13 and 15, as it is common to find control buttons on a typical computer mouse. However, the present techniques for compensating for drift error and hand jitter error are suitable for use in systems/devices with fewer, more, or no control buttons or other control inputs.

A processing device (i.e. control circuitry) processes the Gyro data from Gyro mouse 11 to determine a corresponding movement of a computer cursor on a display screen. The Gyro data from each Gyro sensor is preferably converted to Gyro angle velocity data G, and a rotation angle is then determined from the Gyro angle velocity data G. Further preferably, the rotation angles from Gyro sensors are further processed and combined to determine an appropriate movement of the computer cursor.

To simplify the following discussion, a preferred method for calculating a rotation angle from Gyro data is first presented. This includes a discussion of converting Gyro data to Gyro angle velocity data G, and calculating a rotation angle from the Gyro angle velocity G.

A preferred method in accord with the present invention for computing an unintended mouse movement (due to drift error or hand jitter) from the Gyro angle velocity data G is then presented. Thus, an integral component of the present invention is calculation of the Gyro angle velocity G of each Gyro sensor.

For ease of explanation, the Gyro data obtained directly from a Gyro sensor and the Gyro angle velocity data G (which is calculated from the Gyro data) prior to applying any drift error compensation or hand jitter compensation is termed "raw", below.

Within a gyroscope-based device in accord with the present invention (i.e. a Gyro mouse, in the present example), each Gyro sensor generates an analog signal (i.e. output voltage) indicative of detected physical displacement along its respective axis of observation. These analog signals are typically sampled and converted to a representative digital signal/value (i.e. they undergo an analog-to-digital (A-to-D) conversion) by means of an analog-to-digital converter, ADC. That is, each sampled analog signal is converted to an equivalent "ADC value", which is its output Gyro data.

It is noted that each Gyro sensor will produce its own output Gyro data (i.e. its own output ADC values), indicative of its own detected position displacement. Since each Gyro sensor functions independently, it is typically preferred to calibrate the outputs of all the Gyro sensors so that their respective Gyro data may be properly combined. In other words, the variance between the multiple Gyro sensors within the Gyro mouse may necessitate a calibration process to calibrate the output from all the Gyro sensors. This calibration process results in the determination of a distinct "calibration-offset" value (or reference offset voltage) for each respective Gyro sensor. Each Gyro sensor's calibration-offset value is subtracted from its respective output ADC value. The following determination of Gyro angle velocity data G assumes a calibration-offset value for each Gyro sensor.

The following Equation A may be used to convert raw Gyro data (G_ADC) (i.e. raw output ADC values) to corresponding raw Gyro angle velocity data (G).

$$G_x = (G\_ADC_x) * (G\_ADC\text{StepSize}/G\_ADC\text{ConvertFactor})$$

$$G_y = (G\_ADC_y) * (G\_ADC\text{StepSize}/G\_ADC\text{ConvertFactor})$$

$$G_z = (G(A)ADC_z) * (G\_ADC\text{StepSize}/G\_ADC\text{ConvertFactor}) \quad (A)$$

where $G_x$, $G_y$ and $G_z$ are raw Gyro angle velocity data for each of a respective x-axis gyroscope, y-axis gyroscope and z-axis gyroscope; $G\_ADC_x$, $G\_ADC_y$ and $G\_ADC_z$ are raw output Gyro ADC values (i.e. raw Gyro data) from each respective x-axis, y-axis and z-axis gyroscope; G_ADCStepSize is the analog-to-digital conversion step size of each gyroscope's ADC; and G_ADCConvertFactor is the gyroscope-ADC convert factor, which indicates the Gyro sensitivity after an ADC amplification gain. Equation (A) assumes that the G_ADCStepSize and G_ADCConvertFactor are the same for all Gyro sensors, but this is not critical to the invention.

However, it is preferred that the raw ADC values (G_ADC) be corrected by their respective calibration-offset value (G_CalOffset) prior to calculation of its Gyro angle velocity G. This leads to the following Equation (1), which consequently identifies the corrected, raw Gyro angle velocity as "G_Corr" for each respective Gyro sensor.

$$G\_Corr_x = (G\_ADC_x - G\_\text{CalOffset}_x) * (G\_ADC\text{StepSize}/G\_ADC\text{ConvertFactor})$$

$$G\_Corr_y = (G\_ADC_y - G\_\text{CalOffset}_y) * (G\_ADC\text{StepSize}/G\_ADC\text{ConvertFactor})$$

$$G\_Corr_z = (G\_ADC_z - G\_\text{CalOffset}_z) * (G\_ADC\text{StepSize}/G\_ADC\text{ConvertFactor}) \quad (1)$$

where $G\_Corr_x$, $G\_Corr_y$ and $G\_Corr_z$ are corrected, raw Gyro angle velocity data for each of a respective x-axis gyroscope, y-axis gyroscope and z-axis gyroscope; $G\_ADC_x$, $G\_ADC_y$ and $G\_ADC_z$ are raw output Gyro ADC values from each respective x-axis, y-axis and z-axis gyroscope; $G\_\text{CalOffset}_x$, $G\_\text{CalOffset}_y$ and $G\_\text{CalOffset}_z$ are the calibration-offset values for each respective x-axis, y-axis and z-axis gyroscope; G_ADCStepSize is the analog-to-digital conversion step size of each gyroscope's ADC; and G_ADCConvertFactor is the gyroscope-ADC convert factor, which indicates the Gyro sensitivity after an ADC amplification gain. Equation (1) assumes that the G_ADCStepSize and G_ADCConvertFactor are the same for all Gyro sensors, but this is not critical to the invention.

"G_ADCStepSize" refers to the A-to-D conversion step size of a Gyro ADC, i.e. the threshold voltages that indicate a change in an equivalent digital value (i.e. the mV step value corresponding to an ADC discrete count step). For example, if one has a 12-bit ADC, then the 12-bit ADC is capable of identifying $2^{12}$, or 4096, count steps. Assuming an operating voltage VDD of 3.3V (i.e. 3300 mV), then the G_ADC_StepSize is (3300 mV)/(4096 count)=0.80566 mV/count.

The gyroscope-ADC convert factor, "G_ADCConvertFactor", refers to the Gyro sensitivity after an ADC amplification gain. It can be defined as: G_ADCConvertFactor=(A-to-D amplification gain)*(Gyro Sensor's Sensitivity). For example, if a Gyro sensor's sensitivity is 0.67 mV/dps and its A-to-D amplification gain is 8-times, then its G_ADCConvertFactor (i.e. its sensitivity after ADC amplification) is 5.36 mV/dps.

To simplify Equation (1), it is helpful to define a ratio (i.e. a G_Ratio) that combines the ADC_StepSize and the G_ADCConvertFactor as:

$$G\_\text{Ratio} = G\_ADC\text{StepSize}/G\_ADC\text{ConvertFactor} \quad (2)$$

In the present example, given an VDD=3300 mV, a 12-Bit ADC, a Gyro sensor sensitivity of 0.67 mV/dps and an A-to-D amplification gain of 8-times, then G_Ratio=(3300 mV/$2^{12}$ count)/(0.67 mV/dps*8)=0.15031 dps/count.

To further simplify Equation (1), it is preferred to combine the raw ADC values of each Gyro sensor with its corresponding calibration-offset value to define a corrected, raw ADC value, G_ADC_Corr, for each Gyro sensor. Each Gyro sensor's corrected raw ADC value can thus be defined as follows:

$$G\_ADC\_Corr_x = (G\_ADC_x - G\_CalOffset_x)$$

$$G\_ADC\_Corr_y = (G\_ADC_y - G\_CalOffset_y)$$

$$G\_ADC\_Corr_z = (G\_ADC_z - G\_CalOffset_z) \quad (3)$$

By combining Equations (2) and (3), Equation (1) can be rewritten as Equation (4), below, to define the raw Gyro angle velocity data as:

$$G\_Corr_x = G\_ADC\_Corr_x * G\_Ratio$$

$$G\_Corr_y = G\_ADC\_Corr_y * G\_Ratio$$

$$G\_Corr_z = G\_ADC\_Corr_z * G\_Ratio \quad (4)$$

In the preferred embodiment, the rotation angles of the Gyro mouse are computed from Gyro angle velocity data C_Corr obtained from its x-axis Gyro sensor and z-axis Gyro sensor to obtain 2D mouse movement data. However, three-axis formulas for determining Gyro angle velocity are shown in Equations (1) to (4) to illustrate that the present invention is equally applicable to gyroscope-based systems/devices monitoring more than two dimensions, such as in 3D Gyro mouse applications.

Derivation of the rotation angles from Gyro angle velocity G_Corr is described below, but first it is helpful to describe another example of a gyroscope-based device in accord with the present invention that incorporates multiple Gyro sensors.

As is explained above, the present invention is suitable for use in a Gyro mouse, but the present invention is equally suitable for other systems/applications/devices wherein one or more gyroscopes are utilized. For instance, the present invention may be incorporated into a camera (such as digital still-picture camera and/or video camera) that uses gyroscopes to compensate for camera vibration/shaking. For illustration purposes, an example of a camera with three integrated Gyro sensors to monitor its angle position is now described.

Figure 3:
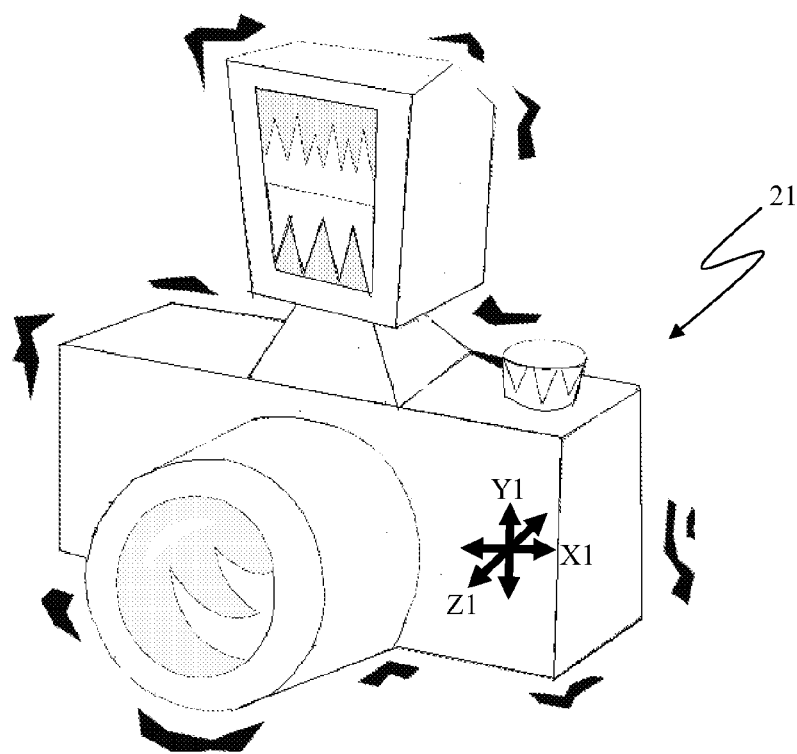
FIG. 3 is an example of another gyroscope-based device represented by a gyroscope-based camera.

With reference to FIG. 3, camera 21 is equipped with three Gyro sensors X1, Y1 and Z1 (represented by double-sided arrows defining dimension/axes markers). Camera rotation (or camera shaking) can be estimated by monitoring its rotation angles about its x, y and z axes. In the present case, the shaking of the camera would be analogous to the shaking of a Gyro mouse (i.e. hand jitter), and drift error in the camera would be analogous to drift error in a Gyro mouse.

Rotation angles about the x, y, and z axes for camera 21 or Gyro mouse 11 may be calculated by integrating/summing Gyro angle velocity data (for example, G or G_Corr) during a predefined, specific time period T. For example in camera 21, time period T may be the exposure time for a single image (such as a single motion blurred image) or the time interval between two (or more) consecutive images in a multi-frame mode. It is to be understood that to compensate for drift error and/or hand jitter error, one would use Gyro angle velocity data that incorporates compensation for such errors, as is explained below.

Rotation angles $\alpha$, $\beta$ and $\gamma$ about the x, y and z axes, respectively, may be calculated from the Gyro angle velocity data G as follows:

$$\alpha = \int_0^T G_x dt = \sum_{i=1}^{N} G_x(i) * \Delta t \quad (5)$$

$$\beta = \int_0^T G_y dt = \sum_{i=1}^{N} G_y(i) * \Delta t$$

$$\gamma = \int_0^T G_z dt = \sum_{i=1}^{N} G_z(i) * \Delta t$$

where T is the pre-defined specific time period, $G_x$, $G_y$, and $G_z$ are Gyro angle velocity data (preferably corrected by a calibration-offset, as described above, and having drift error and hand jitter compensation, as described below), N is the number of Gyro angle velocity datum samples obtained during time period T, and $\Delta t$ is the interval between Gyro angle velocity datum samples. For example, if in the present illustration it is assumed that the sampling rate of a Gyro sensor is approximately 100 Hz, then $\Delta t$ is about 10 ms between Gyro angle velocity datum samples.

Thus, whether the presently preferred invention for compensating for gyroscope drift error or hand jitter error is integrated into a Gyro mouse, camera, or other gyroscope-based device, the presently preferred invention is suitable for any gyroscope-based application with no or minimal variation, which is considered within the scope of those versed in the art.

Figure 4:
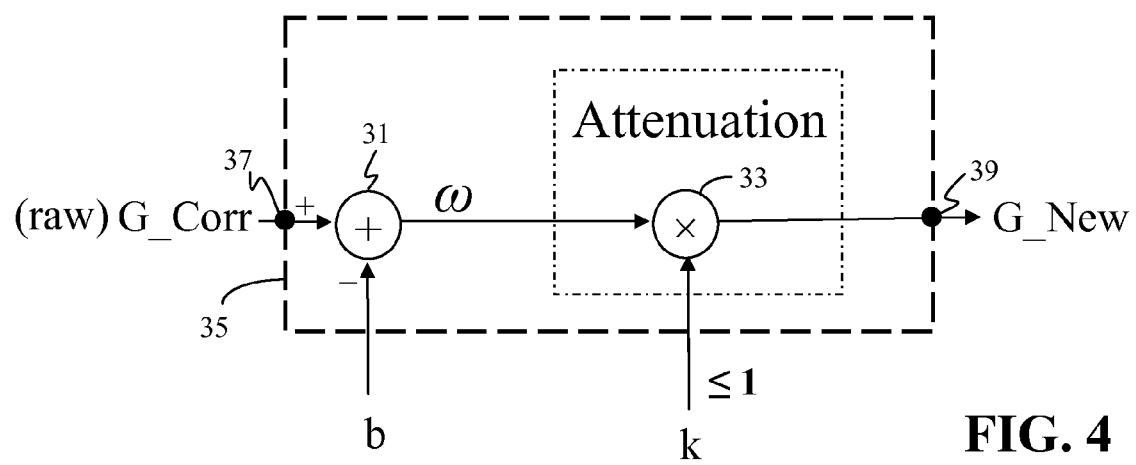
FIG. 4 is a representation of a preferred method of addressing gyroscope drift-error and hand jitter error.

Returning now to the subject of drift error compensation and hand jitter compensation, FIG. 4 illustrates a simplified representation of a system (or gyroscope-based device/application) in accord with an embodiment of the present invention for compensating for these errors. Raw Gyro angle velocity G, or more preferably calibration-corrected Gyro angle velocity G_Corr, is applied to input 37 of error-compensation block 35, and a new, drift-and-hand-jitter-compensated Gyro angle velocity G_New is produced at output 39.

Gyro angle velocity G_Corr is passed to summation node 31, where it is reduced by the value of compensation offset b to compensate for drift error. The output from summation node 31 is a drift-compensated, intermediate Gyro angle velocity w that may still have hand jitter error. The output of summation node 31 is sent to multiplication node 33. The magnitude of intermediate Gyro angle velocity w is then scaled (preferably scaled down, or left unaltered) by compensation factor k to compensate for hand jitter. In the preferred embodiment, compensation factor k reduces (i.e. attenuates) the magnitude of intermediate Gyro angle velocity w to produce the new, drift-and-hand-jitter-compensated Gyro angle velocity G_New at output 39. An important aspect of the present invention is the method for determining appropriate values for drift error compensation offset b and hand jitter compensation factor k.

The following are preferred methods for implementing hand jitter and drift error compensation by continuously updating (i.e. continuously re-calculating) hand jitter compensation factor k and drift error compensation offset b. Unintentional cursor motion such that caused by hand jitter is reduced by applying compensation factor k to reduce the magnitude of intermediate Gyro angle velocity w in a manner directly proportional to the amount/magnitude of unintended cursor motion. Likewise, the value of compensation offset b is dependent upon the amount of calculated drift error. Each method contributes to the definition of drift-and-hand-jitter-compensated Gyro angle velocity G_new. In the following discussion, G_new for each of three Gyro sensors may be identified as $G\_New_x$, $G\_New_y$ and $G\_New_z$ for respective x-axis, y-axis and z-axis Gyro sensors.

G_New$_x$, G_New$_y$, and G_New$_z$ may be generated from respective raw calibration-corrected angle velocities G_Corr$_x$, G_Corr$_y$ and G_Corr$_z$ (or raw G$_x$, G$_y$ and G$_x$ if calibration correction is omitted), respectively. Drift error may be compensated by subtracting from raw G_Corr$_x$, G_Corr$_y$ and G_Corr$_z$ a respective, continuously updated, drift error compensation offset b$_x$, b$_y$, b$_z$ individually (and independently) determined for each respective x-axis, y-axis and z-axis Gyro sensor. Hand jitter error may be compensated by applying a respective variable hand jitter compensation factor k$_x$, k$_y$, k$_z$ computed to reduce the respective hand jitter error of each Gyro sensor. A preferred method for determination of G_New$_x$, G_New$_y$, G_New$_z$ is shown in Equation (6).

$$G\_New_x = (G\_Corr_x - b_x) \times k_x$$

$$G\_New_y = (G\_Corr_y - b_y) \times k_y$$

$$G\_New_z = (G\_Corr_z - b_z) \times k_z \quad (6)$$

In the case of the above-described camera 21 or Gyro mouse 11, G_New$_x$, G_New$_y$ and G_New$_z$ may be used to calculate its rotation angle with reduced/eliminated drift error and hand jitter error. The rotation angle calculation of equation (5) can therefore be updated as shown in equation (7).

$$\alpha = \int_0^T G\_New_x dt = \sum_{i=1}^{N} G\_New_x(i) * \Delta t$$

$$\beta = \int_0^T G\_New_y dt = \sum_{i=1}^{N} G\_New_y(i) * \Delta t$$

$$\gamma = \int_0^T G\_New_z dt = \sum_{i=1}^{N} G\_New_z(i) * \Delta t \quad (7)$$

where T is the specific time period, G_New$_x$, G_New$_y$ and G_New$_z$ are updated Gyro angle velocity data, N is the number of new Gyro angle velocity datum samples during time period T, and Otis the interval between the new Gyro angle velocity datum samples.

Drift error may be determined during periods when the Gyro mouse is motionless, since during these periods any signal changes output from a Gyro sensors would be due to its inherent, internal drift error. In one embodiment of the present invention, a Gyro sensor's drift error may be computed (i.e. estimated or calculated) by a calibration procedure executed during intervals when the Gyro mouse (i.e. gyroscope-based device) is in a static (i.e. motionless) condition, i.e. within a static period. Since true static periods in the operation of an air mouse may be difficult to obtain in practical applications (i.e. applications where a human operator is actively holding/operating the Gyro mouse and the Gyro mouse is not laid down), a classifier to identify quasi-static periods (i.e. periods wherein the device is deemed to be in a sufficiently static condition) may be used. Once Gyro angle velocity data is obtained at several true static periods, or true quasi-static periods, a new compensation offset value b$_x$, b$_y$, b$_z$ for each Gyro sensor can be computed.

This method properly updates compensation offsets b$_x$, b$_y$, b$_z$ if a sufficient number of true static periods or true quasi-static periods are identified during any given calibration period. However, this method may be prone to error if non-static periods are erroneously classified (i.e. misidentified) as true quasi-static periods. In practical applications, it has been found difficult to identify true quasi-static periods while the Gyro mouse is actively being used as an air mouse.

The presently preferred method therefore, does not rely on the exact identification of true quasi-static periods, but rather relies on a probability measure of the Gyro mouse being a quasi-static condition. That is, the Gyro sensors are continuously updated in response to every sample of Gyro angle velocity G_Corr generated from every sample n of its output ADC value. This continuous updating constitutes an implicit, continuous compensation procedure while the device is in actual use irrespective of whether the device is in a static condition, or not.

This preferred method is based on a process, or method, or system that continuously monitors device movements, calculates a probability of the device being in an intended static condition (even if it is not in a true static condition), and updates drift error compensation offsets b$_x$, b$_y$, b$_z$ and hand jitter compensation factors k$_x$, k$_y$, k$_z$ based on their respective, immediate history. For example, if the device was in intended motion in an immediately previous sample (n−1), then the probability that it is still in intended motion in the current sample n is high. Similarly if the device was in an intended static condition in immediately previous sample (n−1), then it is likely to still be in its intended static condition in the current sample n, unless the current sample n indicates a large, or quick, change in Gyro angle velocity; in which case the probability of it still being in an intended static condition is lessened. A description of this preferred method for an implicit, continuous compensation procedure is as follows.

The following method is based on a probability static-condition model that determines a probability of a gyroscope-based device being in an intended static condition during a current Gyro sensor sampling. The preferred probability static-condition model depends not only on the Gyro sensor's current ADC value, but also depends on its motion history, drift error compensation history, and hand jitter compensation history. It is presently proposed that the following factors may be used in the determining a probability of an intended static condition:

1. A Gyro sensor's immediate Gyro angle velocity history may be used to assign a Gyro sensor's current Gyro angle velocity a probability value indicative of whether the Gyro sensor is in an intended static condition (or a quasi-static condition) or experiencing intended movement (or big movement). For example, if the Gyro angle velocity within an immediately-previous history period indicates a small variance in Gyro angle velocities and the mean (average) of Gyro angle velocities within this history period is close to zero, then it is likely that the Gyro sensors is in an intended static condition (i.e. at-rest) during the current sample n of its ADC value.

2. A change in an intended static condition of a Gyro sensor can be determined from the Gyro sensor's current ADC value (i.e. at current sample n). If the Gyro angle velocity computed for the current ADC value is small, then it is likely that the gyroscope-based device is in an intended static condition. Conversely, if the Gyro angle velocity computed for the current ADC value is larger than the threshold (or is indicative of a rapid, or sudden, motion), then it is likely that the Gyro sensor has left a static condition and entered a condition of intentional movement.

Figure 5:
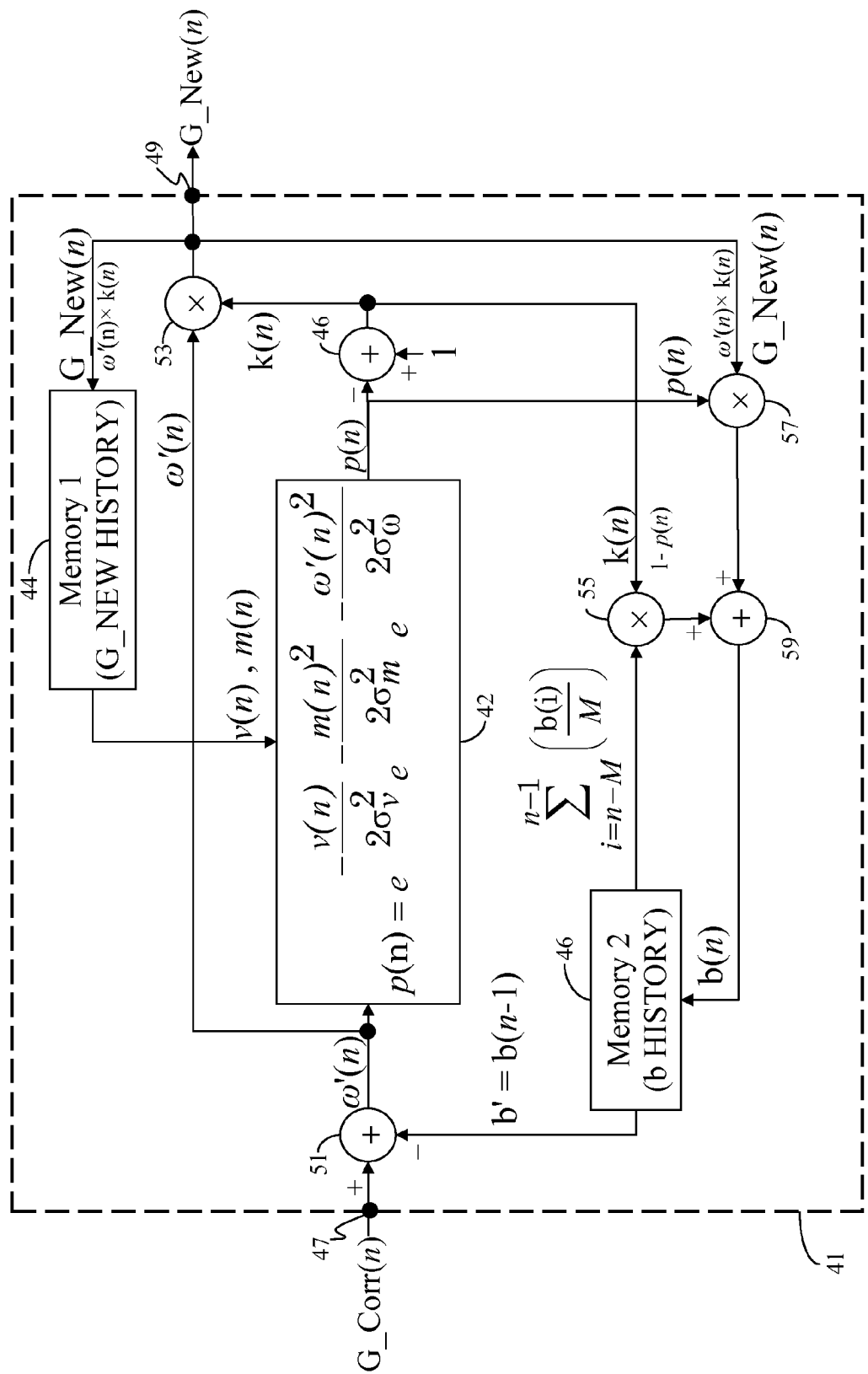
FIG. 5 is a diagram of a preferred implementation of the present invention.

For ease of explanation, a diagram illustrating the generation of G_new (i.e. applicable to any of G_New$_x$, G_New$_y$ or G_New$_z$) in accord with the present invention is shown in FIG. 5. The embodiment of FIG. 5 continuously updates hand jitter compensation k(n) and drift error compensation offset b(n) for every sample n of a Gyro sensor's ADC value.

A system 41 in accord with the present invention may receive at input 47 a current raw, calibration-corrected, Gyro angle velocity data G_Corr(n) computed from a Gyro sensor's current ADC value at current sample n. Alternatively, system 41 may receive raw, uncorrected, angle velocity data G(n) at input 47. In either case, system 41 produces a new, drift-and-hand-jitter-compensated Gyro angle velocity G_New(n) at output 49.

A first distinction between the embodiment of FIG. 5 and that of FIG. 4 is in how G_New is defined. In the embodiment of FIG. 4, it was desirable to remove drift error before checking for hand jitter error. One would first subtract drift error compensation offset b from Gyro angle velocity G_Corr to create intermediate angle velocity w, and a measure of hand jitter error could then be determined from intermediate angle velocity w. By compensating for drift error prior to determining hand jitter, one could conclude that any detected small, or slow, motion within intermediate angle velocity w could be attributed to hand jitter, and adjust compensation factor k accordingly. However, this approach relied on having an accurate value for drift error compensation offset b, which in turn required that the drift error be measured when the gyroscope-based device (i.e. the Gyro mouse) was laid down, or otherwise motionless or in a quasi-static state. Thus, detection of a static state or static period (or quasi-static period) in which to compute drift error was an integral part of the process to compute hand jitter error. In the embodiment of FIG. 5, however, it is desirable to update compensation offset b and compensation factor k without the need for detecting static, or quasi-static, periods, which complicates determination of compensation offset b.

To achieve this, the embodiment of FIG. 5 takes a two-phase approach. A first phase is determination of hand jitter compensation factor k(n) using the probability p(n) of the gyroscope-based device being in an intended static condition and an estimate of compensation offset b(n). Preferably, the estimate of compensation offset b(n) is also used in the computation of probability p(n). Also in this first phase, G_New (n) is preferably computed using the determined compensation factor k(n) and the estimated value for compensation offset b(n).

The second phase is to use the determined compensation factor k(n), the computed probability p(n), G_New(n), and the history of prior compensation offset b values from previous cycles to compute a new compensation offset b(n) for the current cycle.

In the first phase, Gyro angle velocity data G_Corr(n) is applied to input 47 and submitted to summation node 51, where it is combined with an estimated drift error compensation offset b'. Preferably, estimated drift error compensation offset b' is defined prior to any probability calculations on current Gyro angle velocity data G_Corr(n). Estimated compensation offset b' is used to cancel out drift error, which results in an estimated intermediate angle velocity ω'. Since determination of probability value p(n), compensation factor k(n) and output G_New(n) is dependent upon estimated intermediate angle velocity ω', identifying a good value for estimated drift error compensation offset b' is important.

Given that drift error is known to change slowly over time, the presently preferred embodiment renders a value for estimated drift error compensation offset b' by taking advantage of the relatively high frequency operation of a Gyro sensor. The presently preferred sampling rate for the Gyro sensor is 100 Hz, which means that a new ADC value is sampled every 10 ms. Thus, only about 10 ms would have elapsed between a current Gyro angle velocity data input (i.e. G_Corr(n)) and its immediately previous Gyro angle velocity data input (i.e. G_Corr(n−1)). Consequently, only about 10 ms would have elapsed since its immediately previous compensation offset b(n−1) was determined. Assuming that the drift error has not changed much in the 10 ms between G_Corr(n−1) and G_Corr(n), the presently preferred embodiment uses b(n−1), the compensation offset of the immediately previous cycle, as the estimated compensation offset b' in a current cycle.

Estimated intermediate angle velocity w' is then applied to probability static-condition model block 42 and to multiplication node 53, where it awaits compensation offset factor k(n). Probability static-condition model block 42 renders a probability p(n) of the gyroscope-based device being in a static condition. Hand jitter compensation factor k(n) is then determined at summation node 55 from rendered probability p(n).

In the embodiment of FIG. 5, G_New(n) is defined at node 53 from the combination of k(n) and estimated intermediate angle velocity ω'. G_New(n) is then stored in first memory 44 to maintain a history of G_New to be used in Probability static-condition model block 42 in the next sampling (n+1) of ADC data from the Gyro sensor.

The probability model of probability static-condition model block 42 is preferably defined by Equation (8), as follows:

$$p(n) = \left(e^{-\frac{v(n)}{2\sigma_v^2}}\right)\left(e^{-\frac{m(n)}{2\sigma_m^2}}\right)\left(e^{-\frac{\omega'(n)}{2\sigma_{\omega'}^2}}\right) \quad (8)$$

where p(n) is the probability of a Gyro sensor being in an intended static-condition at sample n (i.e. where n is the nth ADC value sample), v(n) is the variance of Gyro angle velocity G_Corr over a short, fixed immediate history period of preferably 500 samples, m(n) is the mean of Gyro angle velocities over the same fixed immediate history period, and w'(n) is the estimated intermediate angle velocity obtained by combining the current Gyro angle velocity G_Corr(n) and the estimated compensation offset b'. That is, ω'(n)=G_Corr(n)+ [−b(n−1)], as illustrated by summation node 51. Values $\sigma_v$, $\sigma_m$ and $\sigma_{w'}$ are probability parameters used to adjust the v(n), m(n), and ω'(n). Preferably, $\sigma_v$, $\sigma_m$ and $\sigma_\omega$ are given values of 1 dps, 0.3 dps, and 3 dps, respectively.

The variance v(n) and mean m(n) values of the Gyro angle velocity G_Corr are preferably calculated over a fixed, short period T defined by 30 ADC value samplings. In a preferred implementation, the Gyro sensors operate at 100 Hz, so the 30 samples translate to a time period of 300 msec.

Mean m(n) and variance v(n) are preferably defined by Equations (9) and (10), respectively.

$$m(n) = \sum_{i=n-T}^{n-1} \frac{G\_New(i)}{T} \quad (9)$$

$$v(n) = \sum_{i=n-T}^{n-1} \frac{(G\_New(i) - m(n))^2}{T} \quad (10)$$

where T is the sample number in the fixed time, and G_New (i) is a history of updated Gyro outputs (as stored in first memory 44), and where i<n.

The estimated intermediate angle velocity ω'(n) is preferably calculated by the Equation (11).

$$\omega'(n) = G\_Corr(n) - b(n-1) \quad (11)$$

where G_Corr(n) is the Gyro angle velocity from an individual Gyro sensor calculated by Equation (4). Estimated compensation offset b(n−1) is the compensation offset value computed for the immediately, previous sample. The initial estimated compensation offset value for b(0) is preferably set to be zero.

A current compensation factor k(n) is preferably computed directly from output p(n) of probability static-condition model block 42. That is, hand jitter compensation factor k(n) is preferably defined by Equation (12), as illustrated by summation block 46.

$$k(n)=(1-p(n)) \quad (12)$$

If probability static-condition model block 42 indicates that the probability of a Gyro sensor being in an intended static condition within the current sample n is close 100 percent (i.e. p(n) is close to 1), then a majority of the motion is likely due to hand jitter since drift error compensation would have already been provided by b(1−n). With p(n) close to 1, k(n) becomes close to 0, and since G_New is determined by multiplying the drift-compensated angle velocity ω' by compensation factor k (see Equation (6)), as illustrated by multiplication node 53, motion indicator output G_New is brought close to zero and unintended cursor motion due to hand jitter is thus reduced (i.e. the cursor is stabilized).

As the probability of a Gyro sensor being in an intended static condition, as indicated by p(n), within the current sample n is reduced, the attenuating value of compensation factor k is likewise reduced, permitting G_New is to convey more of the motion signal value.

G_New(n) is stored in first memory 44, which maintains a history (i.e. a memory store) of G_New values.

The second phase is to estimate a new drift error, compensation offset b(n) for the current sample n. As is explained above, compensation offset b(n) is dependent upon probability output p(n). Preferably, compensation offset b(n) is computed by Equation (13), as illustrated by multiplication nodes 55 and 57 and by summation node 59.

$$b(n)=(k(n)\times\omega'(n)\times p(n))+(b\_p(n)\times(1-p(n))) \quad (13)$$

where b(n) is the computed compensation offset b for sample n, k(n)×ω'(n) defines the current output Gyro angle velocity G_New(n) at sample n in the embodiment of FIG. 5, p(n) is the probability of a Gyro sensor being in an intended static-condition as determined by probability static-condition model block 42, and b_p(n) is a prediction of an expected compensation offset value based on a moving average over a fixed period defined by a fixed number of samplings, M.

The prediction value for b_p(n) can be computed by the moving average defined by Equation (14):

$$b\_p(n) = \sum_{i=n-M}^{n-1} \frac{b(i)}{M} \quad (14)$$

where b(i) are the previous compensation offset values, i<n, and M is the number of samples in the fixed period. Preferably, M is set to 500 samples, which in the preferred implementation of the Gyro sensors operating at 100 Hz translates to a time period of 5 seconds.

The calculated compensation offset b(n) for the current sample is then stored in a second memory 46 to maintain a history of past drift error compensation offset values.

For example, if probability static-condition model block 42 determines that the chances of a Gyro sensor being in an intended static condition is close to 100% (i.e. p(n)≈1), then motion indicated by the Gyros sensors is primarily due to drift error since hand jitter compensation has already been applied, and compensation offset b can be updated as indicated by Equation (13).

Conversely, if probability static-condition model block 42 determines that the Gyro sensor is most probably experiencing intentional motion (i.e. big motion), then the current motion indicated by the Gyro sensor will not be an good indicator of drift error. In the case, since drift error changes slowly over time, the current drift error compensation offset b(n) can be determined primarily by the moving average over its immediate past, as is indicated by Equation (13).

If probability static-condition model block 42 determines that the Gyro sensor is between intended static conditions and big motion, compensation offset b(n) will be comprised partly from the Gyro sensor's output (i.e. Gyro angle velocity) as negative feedback, and partly from the prediction made from the moving average over its immediate history. With a portion of drift error compensation offset b(n) being predicted from its history, one single sample's misclassification of quasi-static condition will not result in a big error, and the true compensation offset b will be recovered in subsequent samples.

As a result, the present method is robust to noise and is suitable for use in a Gyro mouse, particularly one used as an air mouse, where hand jitter makes strict quasi-static conditions difficult to achieve.

As is explained above, in the embodiment of FIG. 5, the new angle velocity G_New(n) can be directly computed from k(n) and On) using Equation (B), and provided at output 49.

$$G\_New(n)=k(n)\times\omega'(n) \quad (B)$$

Figure 6:
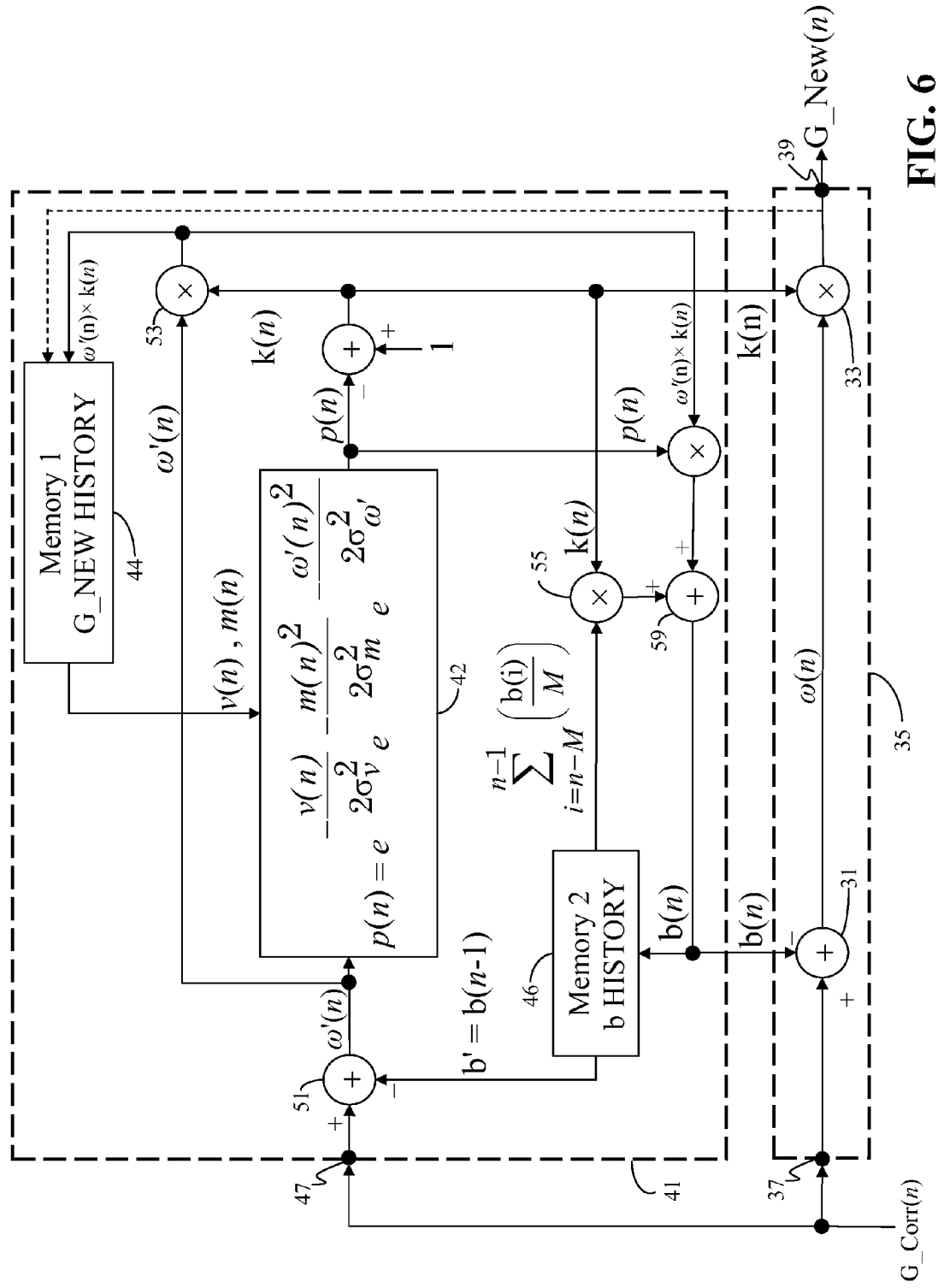
FIG. 6 is a diagram of another preferred implementation of the present invention that combines the techniques of FIGS. 4 and 5.

Although it has been found that using estimated compensation offset b' and estimated intermediate angle velocity ω'(n) as shown in FIG. 5 is sufficient for providing good stabilization of a Gyro sensor, for completeness, an alternate embodiment that uses compensation offset b and intermediate angle velocity ω(n) is shown in FIG. 6. The embodiment of FIG. 6 combines the methods of FIGS. 4 and 5 in the generation of G_New(n). In FIG. 6, where all elements similar to those of FIGS. 4 and 5 have similar reference characters and are described above, the current compensation offset b(n) determined in system 41 is transferred to error-compensation block 35, where it is combined with G_Corr(n) at summation node 31 to create intermediate angular velocity ω(n). Similarly, compensation factor k(n) is transferred from system 41 to error-compensation block 35, where it is combined with ω(n) at multiplaction node 33 to produce G_New(n) at output node 39 in a manner similar to that of FIG. 4. As shown, first memory 44 may store the output of multiplication node 53 as in the embodiment of FIG. 5. However, since in the embodiment of FIG. 6, G_New(n) is defined at multiplication node 33, and not at multiplication node 53, first memory 44 may optionally store the output of multiplication node 53, as indicated by a dotted arrow.

The embodiment of FIG. 5 was assessed by testing with controlled motion (i.e. mechanically aided motion along a single axis) and uncontrolled motion (i.e. free hand motion). The results of these assessments show that the presently preferred embodiment is effective and efficient. Detailed results of these assessments are provided below.

In this assessment, the parameters of the above-listed equations are defined as follows.

Figure 7:
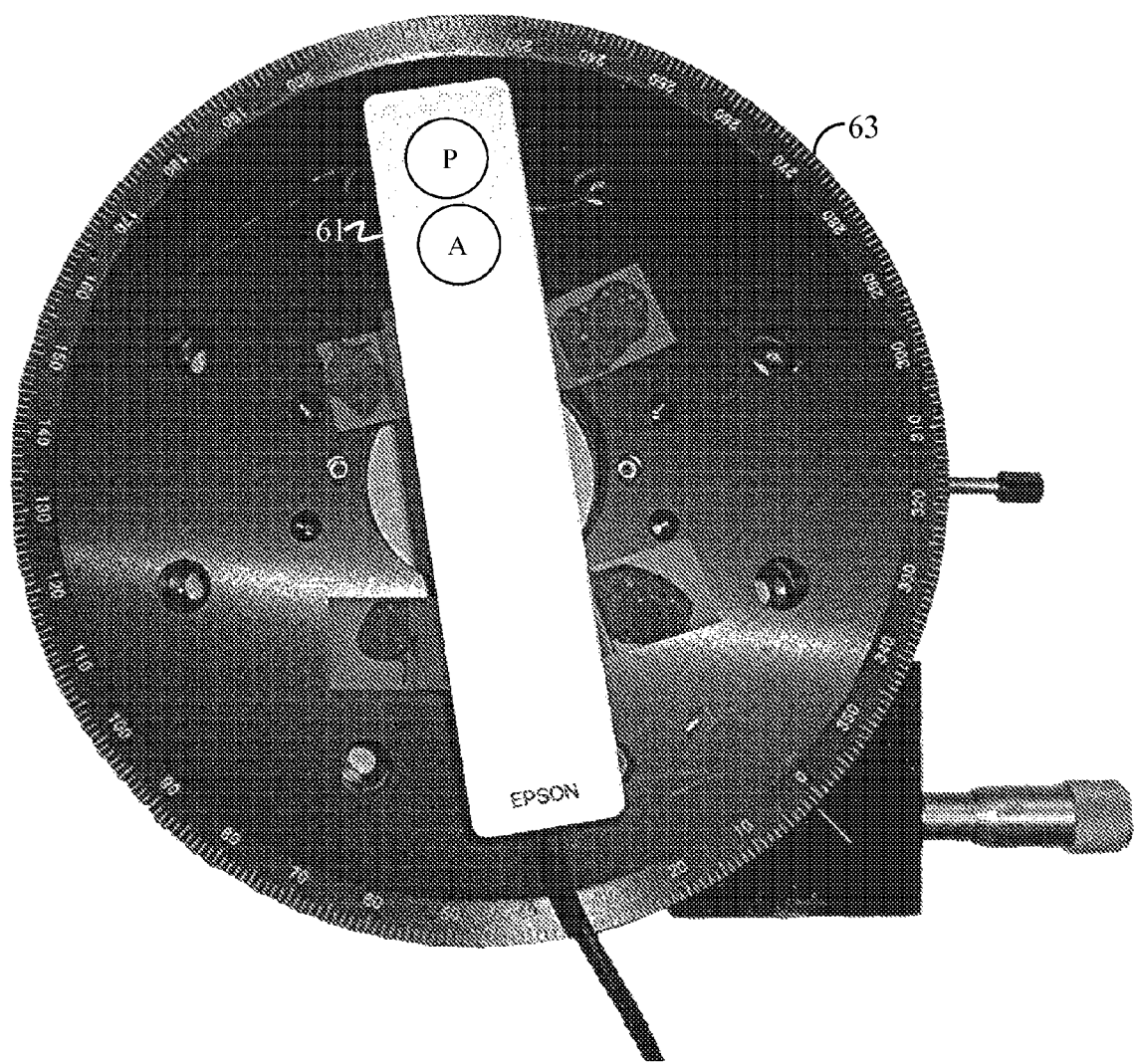
FIG. 7 is an image of a test setup for testing drift error in a gyroscope-based mouse implementing the present invention.

$\sigma_v$=1 (dps)
$\sigma_m$=0.3 (dps)
$\sigma_w$=3 (dps)
T=30 samples or 300 ms
M=500 samples or 5 seconds With reference to FIG. 7, a first set-up tests the present invention for drift error compensation in a controlled mode, i.e. a mode where the Gyro mouse is fixed onto the surface of a rotation platform 61 so as to avoid hand jitter. The aim of this experiment is to investigate drift error and measurement accuracy. First, platform 61 was rotated at a moderate speed by the following listed degrees and the computed Gyro mouse angle movements were compared to the actual movements.

Rotation to 30 degrees and then rotation back to 0 degree.
Rotation to 60 degree and then rotation back to 0 degree.
Rotation to 10 degrees and then rotation back to 0 degree.
Rotation to 60 degrees, then rotation back to 40 degrees, to 20 degrees, and finally to 0 degrees.

Moderate movement, i.e. not too slow or too quick, was used to avoid issues associated with slow motion, i.e. issues of fine cursor control. The Gyro mouse's fine cursor control was evaluated in a separate test.

Figure 8:
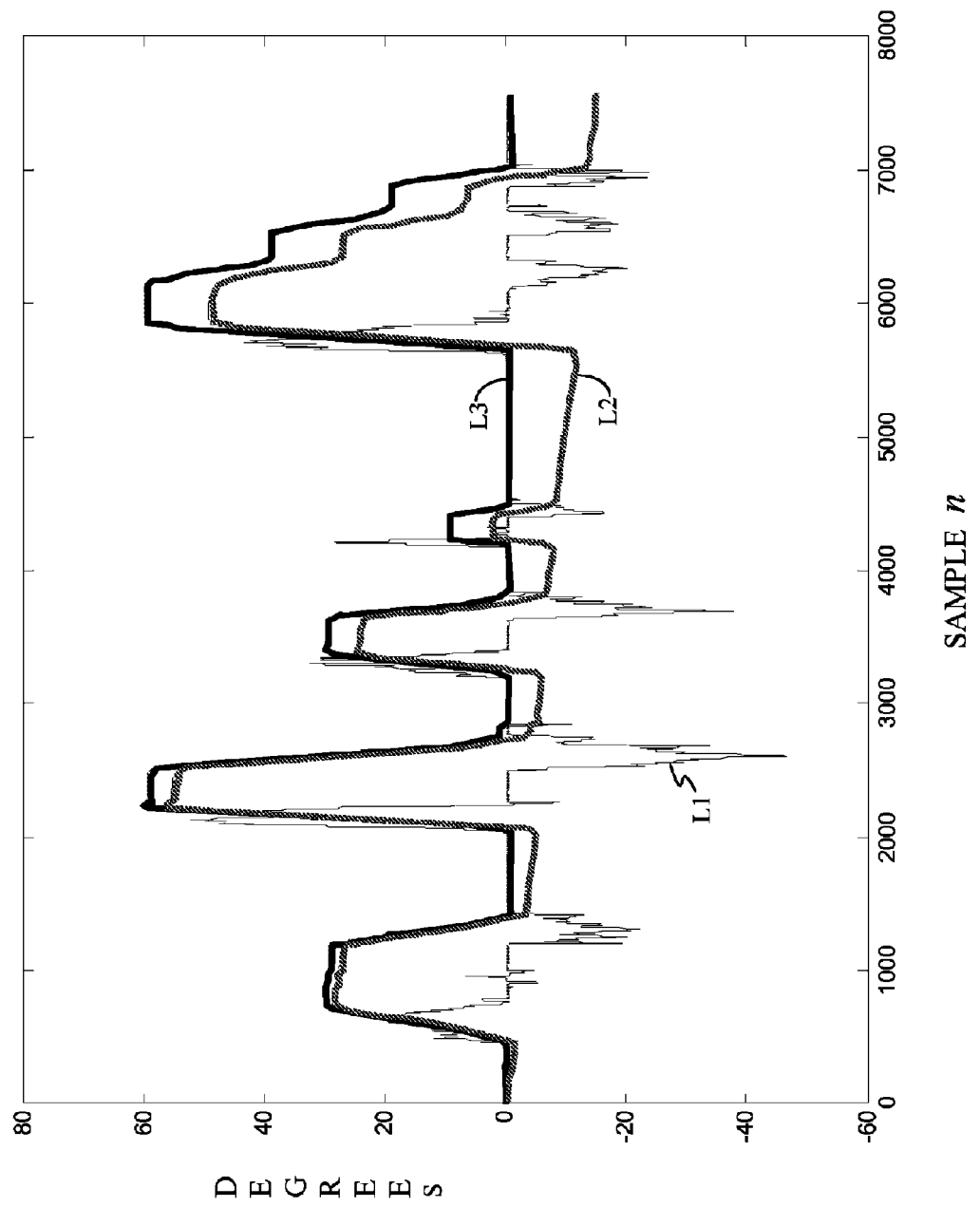
FIG. 8 illustrates test results obtained from the test setup of FIG. 7.

The results of this test are illustrated in FIG. 8. Line L1 illustrates Gyro angle velocity G_Corr obtained directly from a Gyro sensor. The angle velocities' peak values are about 20 dps, 30 dps, 50 dps, etc. Line L2 illustrates the rotation angles calculated directly from the sensor data (i.e. directly from angle velocity G_Corr without drift error compensation), and L3 illustrates the rotation angles calculated from G_New (with drift error compensation as determined using the system of FIG. 5). As shown, L2 demonstrates a progressively increasing, downward drift error. Although the drift error itself may be small, there is more than a 15 degree drift error accumulated after about 75 seconds (the x-axis Gyro sensor is operating at 100 Hz, or 100 samples/second).

By contrast, the rotation angles calculated from new Gyro angle velocity G_New, represented by line L3, in accord with the present invention, show a dramatic reduction drift error. L3 is shown to maintain a drift error of not more than about 0.5 degree for most of its operation. The maximum drift error experienced by L3 is about 0.9 degree at 75 seconds, which includes about 0.1 degrees of drift error accumulated in the initial 30 samples (300 ms) at the beginning of the test before the present method begins its de-drift processing. This accuracy is sufficient for air mouse applications, and thus the present invention is shown to effectively remove drift error.

Figure 9:
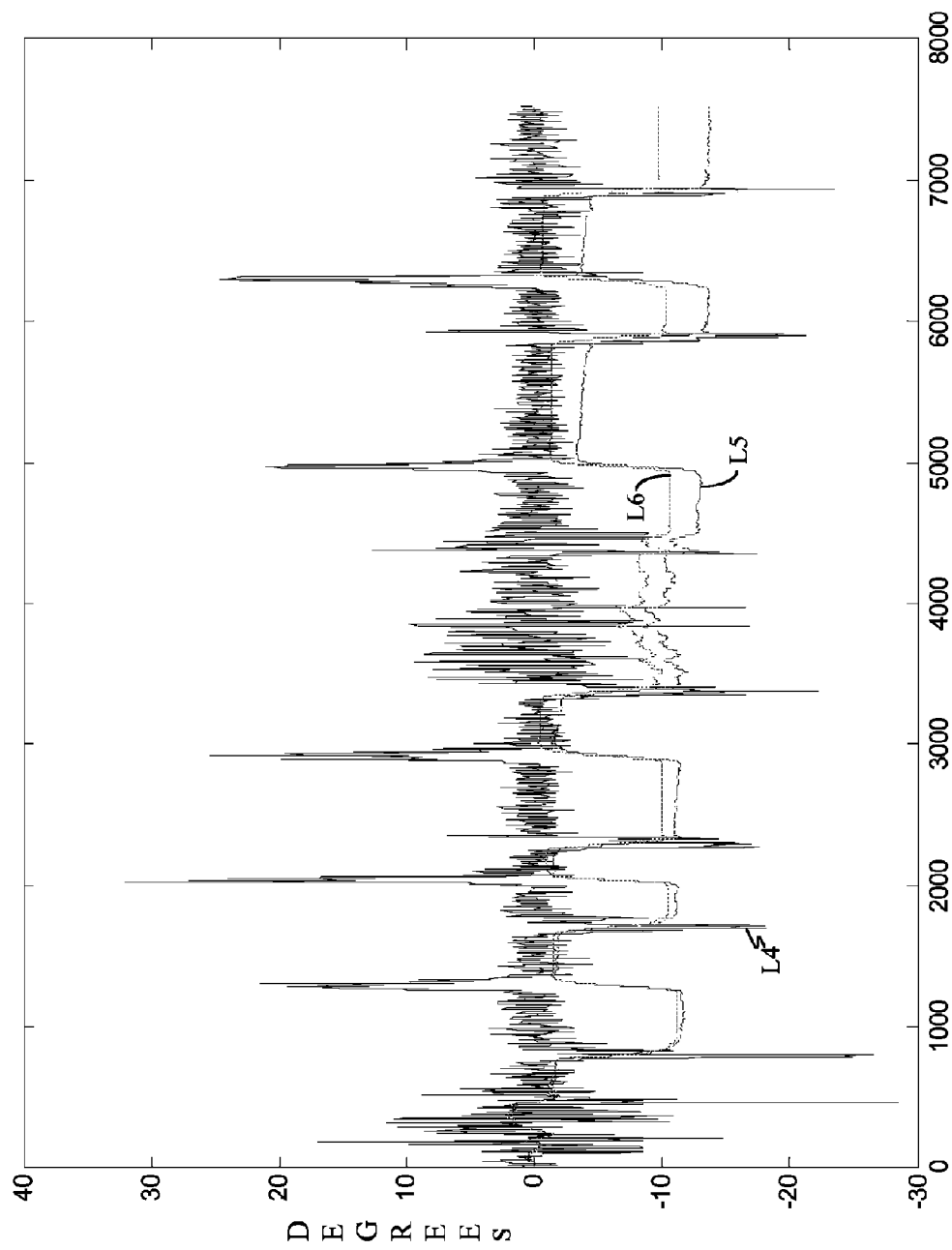
FIG. 9 illustrates test results obtained when testing hand jitter compensation in accord with the present invention.

The results of a second test are shown in FIG. 9. The experimental setup of this second test examines free hand operation (i.e. air mouse operation) of a Gyro mouse in accord with the present invention. The present test evaluates the Gyro mouse's combined drift error compensation and hand jitter compensation as applied using the system of FIG. 5

In FIG. 9, line L5 plots rotation angles computed directly from G_Corr. Line L6 plots rotation angles computed from G_New, obtained after application of both drift error compensation and hand jitter compensation in accord with the present invention. Again for illustrative purposes, raw Gyro angle velocity G_Corr (line L4) is superimposed over L5 and L6.

In this second test, the Gyro mouse was held in a human operator's right hand, and the operator moved, or rotated, the Gyro mouse left from a starting position, then right, and then back to the starting position. The movement was moderate and the peak angle velocities were about 15 dps, 20 dps, 30 dps etc. The angle rotated is about 10 degrees. By using moderate motion, the present invention avoids issues associated with slow motion. The Gyro mouse's fine cursor control is evaluated below.

Line L5 shows drift error accumulation as it drifts downwards. But as indicated by line L6, the present embodiment effectively removes drift error. A comparison of L5 and L6 further shows that that the present embodiment effectively compensates for hand jitter. This is especially evident in the time periods between large movements (indicated by relatively flat lines). Line L6 is nearly unchanged, i.e. flat, in periods between movements, while line L5 shows continuous fluctuations, or oscillations.

As is explained above, prior art method of implementing hand jitter compensation tend to reduce find cursor control of a Gyro mouse due to their tendency to filter out small movements. In order to evaluate how the present method's hand jitter compensation affects the Gyro mouse' response to slow motion (i.e. in order evaluate fine cursor control), an additional experiment was conducted using slow motion within a small range of movement.

Figure 10:
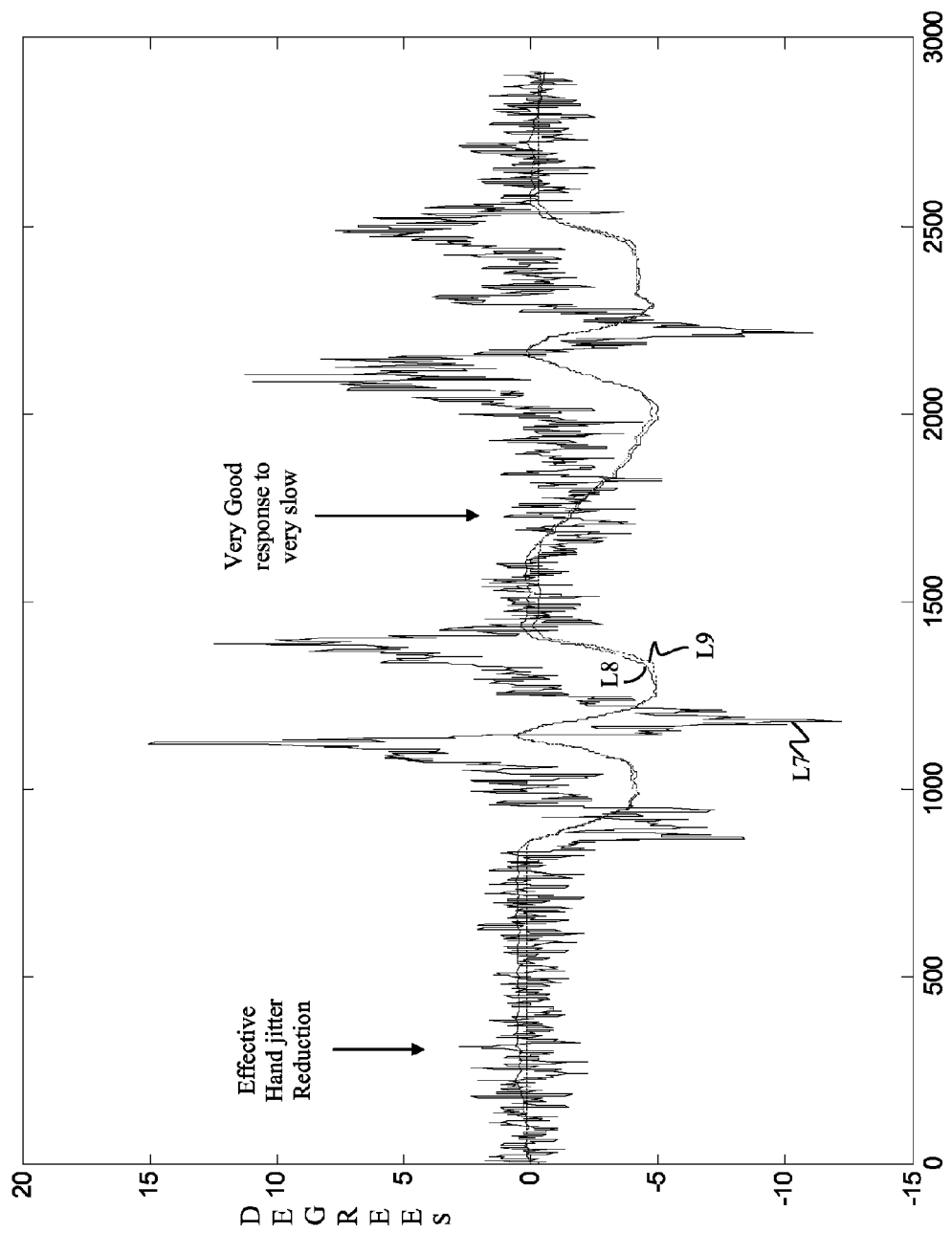
FIG. 10 illustrates test results demonstrating fine cursor control in a gyroscope-based mouse that implements drift error compensation and hand jitter compensation in accord with the present invention.

The results of these tests are shown in FIG. 10. Line L8 indicates rotation angles calculated directly from G_Corr, and thus shows a close response to small movements detected by a Gyro sensor. Line L9 plots rotation angles calculated from G_New. Again for illustration purposes, Gyro angle velocities G_Corr (line L7) are superimposed on L8 and L9.

Again, the Gyro mouse was held in the right hand in freehand movement (i.e. as an air mouse), the device was slowly moved in within a small range from left to right and then returned to its starting position after each rotation. The motion was tested along one axis at different speeds and displacement ranges. This movement is slow and the peak angle velocity for rotations were about 5 dps, 10 dps, 15 dps etc. The angle rotated was about 5 degrees.

As illustrated by line L9, the presently preferred method effectively removes drift error, although the drift is very small in the present case. Comparing the calculated rotation angles of L8 and L9, shows that the present invention provides effective hand jitter reduction while not much effecting fine cursor control. The rotation angles of the present method (L9) are relatively flat and nearly unchanged during the periods between movements, indicating good hand jitter compensation. By contrast, the rotation angles of L8 calculated directly from G_Corr (uncompensated sensor data) show a continuous shaking between periods of movement.

Motion between the period spanning from second 16 to second 20 (i.e. spanning from sample 1600 to 2000) has very slow intentional motion. This motion covered about 5 degrees in about 4 seconds. L8 indicates the true movement since it does not provide any hand jitter compensation. In traditional hand jitter compensation techniques, this slow movement would be filtered out or ignored altogether. By contrast, L9 follows L8 very closely during this period of intentional slow cursor movement; demonstrate a high level of fine cursor control. The present invention thus show a good response to intentional slow movements, while at the same time maintaining very good hand jitter reduction.

From the above test, it can be seen that the presently preferred method effectively reduces hand jitter, and stabilizes a computer cursor when a user is trying to hold a gyroscope-base device steady. The present preferred embodiment further demonstrated a good response to slow motion (i.e. displayed good fine cursor control). The present embodiment showed very little loss of motion when experiencing very small motion.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A gyroscope-based device comprising:
an input for receiving angle velocity data obtained from digitized gyroscope sensor data;
a first summation node for reducing said angle velocity data by a drift error compensation offset;
a first multiplication node for multiplying the result of said first summation node by a variable hand jitter compensation factor to produce a new angle velocity; and
an output node for outputting said new angle velocity;
wherein:
the value of said variable hand jitter compensation factor is dependent upon a computation of involuntary movement currently experienced by said gyroscope-based device as determined from a currently received angle velocity datum;
said computation of involuntary movement is a computation of probability of said gyroscope-based device being in a static state;
each current sample n of said digitized gyroscope sensor data defines a current cycle;
said currently received angle velocity datum is identified as G_Corr(n) and is obtained from current sample n of said digitized gyroscope sensor data;
the new angle velocity obtained from the current sample n of said digitized gyroscope sensor data is denoted as G_New(n); and
said gyroscope-based device further comprising:
a) a probability processing unit receiving said intermediate angle velocity and determining a probability p(n) value for the current sample n, said probability p(n) being said computation of probability of said gyroscope-based device being in a static state within the current cycle defined by current sample n; and
wherein the value of said variable hand jitter compensation factor for the current sample n is denoted as k(n) and is defined as k(n)=1·p(n).

2. The gyroscope-based device of claim 1, wherein said computation of involuntary movement is a determination of the amount of hand jitter being currently experienced by said gyroscope-based device, and said value of said variable hand jitter compensation factor is directly proportional to the determined amount of hand jitter being currently experienced by said gyroscope-based device.

3. The gyroscope-based device of claim 2, further having a predefined number of fixed hand jitter compensation values and the same predefined number of hand jitter value ranges in a one-to-one correspondence; and
said gyroscope-based device identifies the hand jitter value range within which the determined amount of hand jitter being currently experienced resides, and assigns the fixed hand jitter compensation value corresponding to the identified hand jitter value range to said variable hand jitter compensation factor.

4. The gyroscope-based device of claim 3, wherein:
said predefined number of fixed hand jitter compensation values is set to three corresponding to three hand jitter value ranges, said three hand jitter value ranges defining a "small hand jitter user style" range for the lowest hand jitter range, a "normal hand jitter user style" range for the intermediate hand jitter range, and a "big hand jitter user style" range for the highest hand jitter range, and
the hand jitter style range of the gyroscope-based device is continuously monitored, and a determination of whether the gyroscope-based device is being operated in the "small hand jitter user style", the "normal hand jitter user style", or "big hand jitter user style" is continuously updated; and
the fixed hand jitter compensation value corresponding to said "big hand jitter user style" is greater than the fixed hand jitter compensation value corresponding to said "normal hand jitter user style", which in turn is greater than the fixed hand jitter compensation value corresponding to said "small hand jitter user style".

5. The gyroscope-based device of claim 3, wherein the determined amount of hand jitter being currently experienced is determined by comparing the gyroscope-based device's current movements along a given axis with similar movements in its immediate past along the same axis.

6. The gyroscope-based device of claim 1, wherein said probability processing unit implements a static-condition model defined as:

$$p(n) = \left(e^{-\frac{v(n)}{2\sigma_v^2}}\right)\left(e^{-\frac{m(n)}{2\sigma_m^2}}\right)\left(e^{-\frac{\omega'(n)}{2\sigma_{\omega'}^2}}\right)$$

where v(n) is the variance of angle velocity data G_Corr over an immediate history period, m(n) is the mean of the angle velocity data over the same fixed immediate history period, ω'(n) is an intermediate angle velocity defined as ω'(n)=G_Corr(n)−b' where b' is an estimated drift error compensation offset not derived from a current drift error compensation offset computed for the current sample n, and $\sigma_v$, $\sigma_m$ and $\sigma_{\omega'}$, are predefined probability parameters.

7. The gyroscope-based device of claim 6, wherein said immediate history period is fixed and set to the immediate 500 samples of said digitized gyroscope sensor data.

8. The gyroscope-based device of claim 6, wherein probability parameters $\sigma_v$, $\sigma_m$ and $\sigma_{\omega'}$, have values of 1 dps, 0.3 dps, and 3 dps, respectively.

9. The gyroscope-based device of claim 6, wherein variance v(n) and mean m(n) are determined for a period T defined by 30 samples of said digitized gyroscope sensor data.

10. The gyroscope-based device of claim 9, wherein variance v(n) is defined as:

$$v(n) = \sum_{i=n-T}^{n-1} \frac{(G\_New(i) - m(n))^2}{T}$$

and mean m(n) is defined as:

$$m(n) = \sum_{i=n-T}^{n-1} \frac{G\_New(i)}{T}$$

where i<n.

11. The gyroscope-based device of claim 10, wherein samples n of said digitized gyroscope sensor data are provided at a rate of 100 Hz, and period T 300 milliseconds.

12. The gyroscope-based device of claim 1, further comprising a first memory for storing a history of past G_New(n) values determined from previous samples of said digitized gyroscope sensor data, said first memory being coupled to said probability processing unit.

13. The gyroscope-based device of claim 6, wherein said current compensation offset for the current sample n of said digitized gyroscope sensor data is denoted as b(n), and is defined as:

$$b(n)=(k(n) \times \omega'(n) \times p(n))+(b\_p(n) \times (1-p(n)))$$

where b_p(n) is a prediction value based on a moving average over a fixed period defined by a fixed number of a number of samplings M in an immediate history of past b(n) values, b_p(n) being defined as:

$$b\_p(n) = \sum_{i=n-M}^{n-1} \frac{b(i)}{M}$$

where b(i) are the compensation offset values from the indicated previous cycles, and i<n.

14. The gyroscope-based device of claim 13, wherein said estimated compensation b' is defined as b'=b(n−1).

15. The gyroscope-based device of claim 13, further comprising a second memory for storing a history of past b(n) values determined from previous samples of said digitized gyroscope sensor data, said second memory being coupled to said first summation node.

16. The gyroscope-based device of claim 14, wherein said first summation node receives b' and G_Corr(n).

17. The gyroscope-based device of claim 14, wherein said first summation node received b(n) and G_Corr(n).

18. The gyroscope-based device of claim 6, wherein a current compensation offset b is determined for each current sample n of said digitized gyroscope sensor data, and estimated compensation offset b' is set to the compensation offset b determined in the immediately previous cycle.

* * * * *